United States Patent [19]
Gary

[11] Patent Number: 5,891,220
[45] Date of Patent: Apr. 6, 1999

[54] O₂/CO REMOVAL FROM AN INERT GAS BY ADSORPTION ON POROUS METAL OXIDE

[75] Inventor: Daniel Gary, Montigny le Bretonneux, France

[73] Assignee: L'Air Liquide, Societe Anonyme Pour L'Etude et L'Exploitation des Procedes Georges Claude, Paris Cedex, France

[21] Appl. No.: 895,452

[22] Filed: Jul. 16, 1997

[30] Foreign Application Priority Data

Jul. 22, 1996 [FR] France .................................. 96 09177

[51] Int. Cl.⁶ .................................................... B01D 53/04
[52] U.S. Cl. ................................. 95/138; 95/115; 95/140; 95/148
[58] Field of Search ............................. 95/114, 115, 138, 95/140; 96/121, 122, 130, 133, 143, 144, 146; 423/219, 247

[56] References Cited

U.S. PATENT DOCUMENTS

| | | | |
|---|---|---|---|
| 1,971,168 | 8/1934 | Weiss | 423/247 |
| 2,103,221 | 12/1937 | Jenness | 423/247 |
| 3,380,800 | 4/1968 | Marten | 423/247 |
| 4,019,879 | 4/1977 | Rabo et al. | 95/140 |
| 4,054,428 | 10/1977 | Foltz | 96/130 X |
| 4,421,533 | 12/1983 | Nishino et al. | 95/138 |
| 4,451,435 | 5/1984 | Hölter et al. | 423/247 X |
| 4,470,829 | 9/1984 | Hirai et al. | 95/140 |
| 4,696,682 | 9/1987 | Hirai et al. | 95/140 |
| 4,743,276 | 5/1988 | Nishida et al. | 95/140 |
| 4,746,332 | 5/1988 | Tomomura et al. | 95/138 |
| 4,832,926 | 5/1989 | Schillaci | 423/247 X |
| 4,869,883 | 9/1989 | Thorogood et al. | 423/247 X |
| 4,917,711 | 4/1990 | Xie et al. | 95/140 X |
| 5,106,396 | 4/1992 | Mitariten | 95/140 X |
| 5,110,569 | 5/1992 | Jain | 423/247 X |
| 5,126,310 | 6/1992 | Golden et al. | 95/140 X |
| 5,446,232 | 8/1995 | Chen et al. | 423/219 X |
| 5,451,248 | 9/1995 | Sadkowski et al. | 95/138 X |
| 5,478,534 | 12/1995 | Louise et al. | 423/247 X |
| 5,529,763 | 6/1996 | Peng et al. | 95/140 X |
| 5,536,302 | 7/1996 | Golden et al. | 95/138 |
| 5,556,603 | 9/1996 | Succi et al. | 95/140 X |
| 5,607,572 | 3/1997 | Joshi | 95/138 X |

FOREIGN PATENT DOCUMENTS

| | | | |
|---|---|---|---|
| 0 240 270 | 10/1987 | European Pat. Off. | |
| 0 350 656 | 1/1990 | European Pat. Off. | |
| 0 662 595 | 7/1995 | European Pat. Off. | |
| 54-137478 | 10/1979 | Japan | 95/138 |
| 60-210513 | 10/1985 | Japan | 95/140 |
| 0462376 | 3/1982 | U.S.S.R. | 95/138 |
| 2188620 | 10/1987 | United Kingdom | 95/140 |

*Primary Examiner*—Robert Spitzer
*Attorney, Agent, or Firm*—Young & Thompson

[57] ABSTRACT

Process for the purification of a chemically inert gas, containing at least one of the O₂ and/or CO impurities, from at least one of the impurities, characterized in that:

a) the gas to be purified is passed through an adsorbent comprising at least one porous metal oxide, the gas having a temperature greater than or equal to −40° C., b) a gas which is substantially purified from at least one of the O₂ and CO impurities is recovered. Device for implementation of the process.

10 Claims, 1 Drawing Sheet

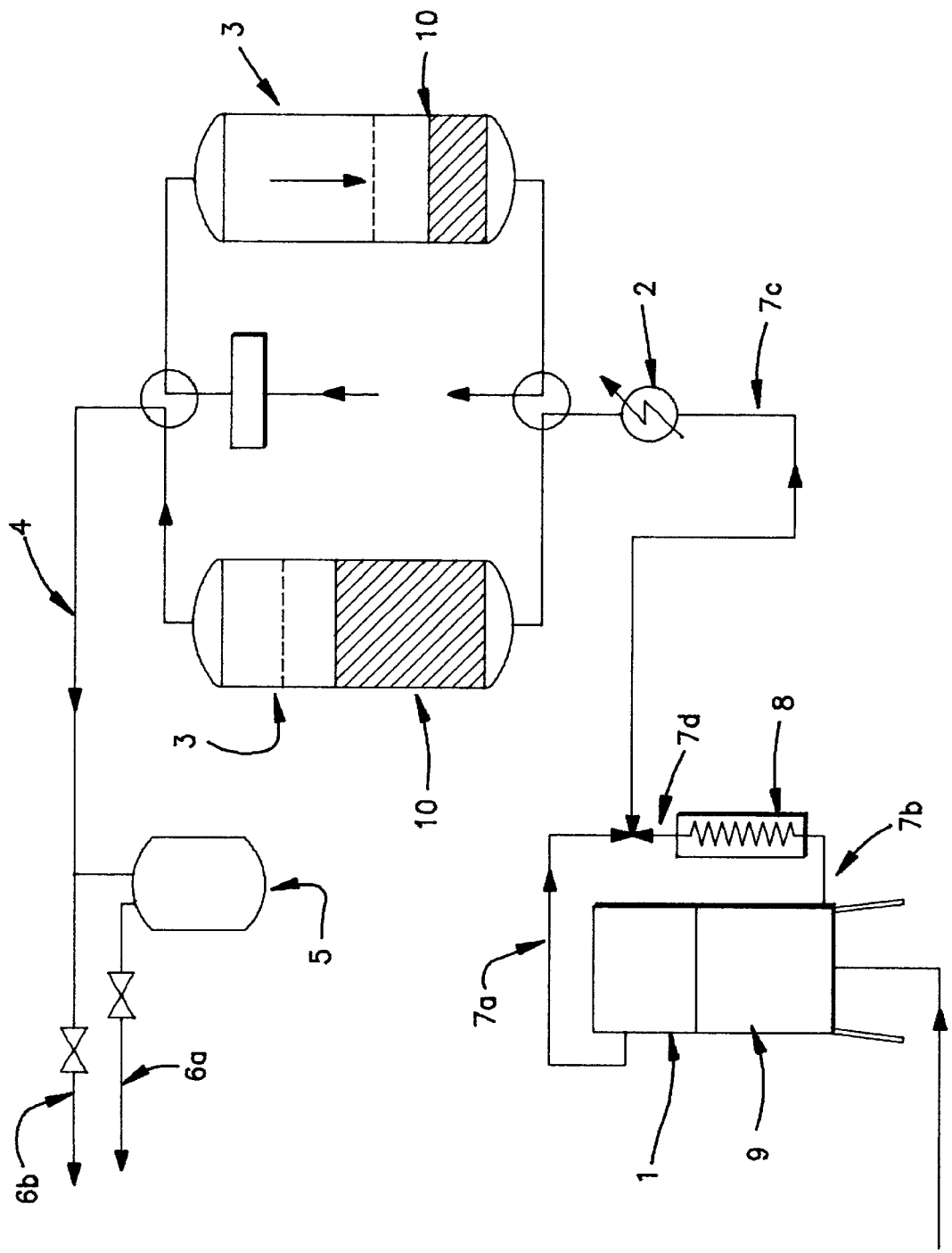

$O_2$/CO REMOVAL FROM AN INERT GAS BY ADSORPTION ON POROUS METAL OXIDE

FIELD OF THE INVENTION

The present invention relates to a process and a device for the purification of a chemically inert gas from at least one of its oxygen and carbon monoxide impurities.

BACKGROUND OF THE INVENTION

Inert gases, such as nitrogen and rare gases, namely helium, neon, argon, krypton, xenon and their mixtures, are commonly employed in many industries, in particular the electronics industry. The latter industry very particularly requires the inert gases to be as pure as possible and in particular freed from their oxygen ($O_2$) and carbon monoxide (CO) impurities.

Now, these inert gases, usually produced by cryogenic distillation, contain impurities of oxygen ($O_2$) and/or carbon monoxide (CO) type, in proportions generally of greater than a few hundreds of ppb (parts per billion by volume).

Consequently, when it is desired to obtain an inert gas which is substantially free from its $O_2$ and/or CO impurities, it is essential to subject this gas to a purification in order to remove the impurities.

Some processes for the purification of inert gases are known in the prior art.

Thus, U.S. Pat. No. 3,996,028 describes a process for the purification of argon by passing this argon through a synthetic zeolite of the type A which makes possible the adsorption of oxygen, the adsorption being carried out at a temperature of between −186° C. and −133° C.

U.S. Pat. No. 5,106,399 describes, for its part, a process for the purification of argon, in particular of liquid argon, which uses a molecular sieve, the oxygen, hydrogen and/or carbon monoxide impurities contained in the flow to be purified being adsorbed preferentially on a material composed of alumina/silica balls supporting a high percentage of nickel.

However, these various known processes exhibit many disadvantages. In particular, they do not make it possible to purify inert gases, such as nitrogen and rare gases, from at least one of their oxygen and carbon monoxide impurities to a level of the order of a ppb (part per billion by volume).

It is thus necessary to develop new processes which make it possible to arrive at such thresholds for the purification of the inert gases from their oxygen and/or carbon monoxide impurities.

Moreover, the known processes are limited from the viewpoint of the throughput of the inert gas to be purified, that is to say of the amount of the inert gas which can be purified during a given time period. Thus, the maximum throughput threshold achieved by the conventional processes generally lies in the region of a few hundreds of $Sm^3/h$.

It is thus necessary to develop processes which make it possible to obtain higher throughputs of substantially purified inert gases.

In addition, some known purification processes also exhibit the disadvantage of being employed at very low temperatures, often lower than −100° C., which requires perfect thermal insulation of the purification device, in order to prevent any entry of heat, and thus generates a large increase in the production costs.

In order to minimize these production costs, it is thus desirable to design a process for the purification of inert gases which can be employed at a temperature greater than or equal to −40° C. and which uses an efficient, commonplace and inexpensive adsorbent.

OBJECT OF THE INVENTION

In short, the aim of the invention is to provide a process which makes it possible to obtain a chemically inert gas, such as nitrogen or rare gases, which is substantially purified from its oxygen and/or carbon monoxide impurities:

which is easy to implement from an industrial viewpoint and from the viewpoint of reasonable costs, which makes it easy to obtain a chemically inert gas of very high purity, that is to say containing at most approximately 1 ppb±1 of oxygen and/or of carbon monoxide (CO), which makes it possible to achieve throughputs of purified gas which are greater than the throughputs achieved by conventional methods, which employs inexpensive and readily accessible adsorbents, and which can be employed at a temperature greater than or equal to −40° C. and preferably at ambient temperature.

SUMMARY OF THE INVENTION

The invention thus consists of a process for the purification of a chemically inert gas, containing at least one of the $O_2$ and CO impurities, from at least one of the impurities, characterized in that:

a) the gas to be purified is passed through an adsorbent comprising at least one porous metal oxide, the gas having a temperature greater than or equal to −40° C., b) a gas which is substantially purified from at least one of the $O_2$ and CO impurities is recovered.

The gas is preferably purified at a temperature of between −40° C. and +50° C.

The gas is preferentially purified at ambient temperature, that is to say at a temperature of between approximately +5° C. and +50° C.

The process according to the invention is particularly suitable for the purification of nitrogen.

The adsorbent is advantageously composed of an oxide of a transition metal or of a mixed oxide of at least two transition metals.

The adsorbent preferably comprises a mixed oxide of copper and of manganese, such as a hopcalite.

In this case, the adsorbent will preferably comprise from 40 to 70% by weight of a manganese oxide and from 25 to 50% by weight of a copper oxide.

Preferentially, the adsorbent is regenerated subsequent to the adsorption of the impurity.

According to a preferred form of the invention, the adsorbent is divided into two distinct regions, one of these regions making it possible to adsorb the impurity while the other is regenerated.

Generally, the flow to be purified is at a pressure of 1 to 30 bar absolute, preferably of the order of 3 to 10 bar absolute.

The present invention also relates to a device for the implementation of the process according to the invention, characterized in that it comprises a source of a chemically inert gas to be purified connected to the inlet of at least one adsorption region containing an adsorbent for the adsorption of at least one of the $O_2$ and CO impurities, the adsorbent comprising at least one porous metal oxide, the outlet of the adsorption region being provided with a connecting pipe emerging in a storage vessel or in a station for use of the gas purified from at least one of the impurities.

Optionally, at least one means for heating the gas to be purified is installed between the source of inert gas to be purified and the inlet of the adsorption region.

Advantageously, the source of inert gas to be purified is a nitrogen production unit.

Preferentially, the adsorption region comprises two reactors operating alternately, that is to say that one of the reactors operates in purification mode while the other is subjected to regeneration.

BRIEF DESCRIPTION OF THE DRAWINGS

A device for the implementation of the process according to the invention will now be described in more detail with reference to the appended FIGURE.

DETAILED DESCRIPTION OF THE INVENTION

The single appended figure represents a device for the implementation of the process according to the invention, comprising a source of nitrogen to be purified (9) from its $O_2$ and/or CO impurities, consisting of a storage vessel (1) containing liquid and/or gaseous nitrogen. A pipe (7a), (7c) makes it possible to convey the gaseous nitrogen from the gaseous headspace of the storage vessel (1) to a preheater (2) which makes it possible to bring the gaseous nitrogen to the desired temperature, for example to ambient temperature, before conveying it to the reactors (3) containing the adsorbent (10) of hopcalite type.

A pipe (7b) makes it possible to convey the liquid nitrogen contained in the storage vessel (1) to an atmospheric evaporator (8); the gaseous nitrogen obtained after evaporation is then conveyed, via the pipes (7d) and (7c), to the reheater (2).

At the outlet of the reactors (3), the gaseous nitrogen purified from at least one of its $O_2$ and CO impurities is conveyed via a pipe (4) to a buffer tank (5) for storage of purified gaseous nitrogen and then to its place of use (not represented) via a pipe (6a).

However, the presence of a buffer tank (5) for storage of purified gaseous nitrogen is not necessary; the purified gaseous nitrogen can also be conveyed directly to its place of use (not represented) via the pipes (4) and (6b).

As represented in the appended figure, use is preferably made not of one but of two reactors (3), each containing the adsorbent of hopcalite type. Thus, it is possible to operate the reactors alternately, that is to say that, while one of the reactors operates in purification mode, the other can be regenerated.

The regeneration is carried out conventionally, for example in accordance with Example 2 below.

The efficiency of the process according to the invention will now be demonstrated using illustrative but non-limiting examples.

In the examples hereinbelow, the adsorbent employed is a hopcalite sold either by the company Dräger and comprising approximately 63% of $MnO_2$ and approximately 37% of CuO, or by the company Molecular Products and comprising 60% by weight approximately of $MnO_2$ and 40% by weight approximately of CuO.

The carbon monoxide (CO) impurity was measured by means of an RGA3 chromatograph sold by the company Trace Analytical. The oxygen impurity was measured continuously by means of an OSK analyzer sold by the company Osaka Sanso Kogyo Ltd. The detection threshold of the RGA3 chromatograph is 1 ppb±1 (part per billion by volume) for carbon monoxide. The detection threshold of the OSK analyzer is 1 ppb±1 for oxygen.

EXAMPLE 1

In order to demonstrate the efficiency of the process of the invention, a gaseous nitrogen flow containing approximately 4 ppm (parts per million) of oxygen ($O_2$) and a little less than 2 ppm of carbon monoxide (CO) was purified through an adsorbent comprising a metal oxide of hopcalite type, the purification being carried out at ambient temperature, that is to say at a temperature of approximately 20° C.

The device used for this purpose is analogous to that described above.

Two successive tests were carried out, these being separated by a regeneration phase at a temperature of approximately 250° C. and by means of an $H_2/N_2$ (5%) mixture.

The results obtained have been incorporated in the following Table I:

TABLE I

| TESTS | TEMPERATURE | Pb | U (m/s) | AT THE INLET (ppm) | | AT THE OUTLET (ppb) | |
|---|---|---|---|---|---|---|---|
| | | | | CO | $O_2$ | CO | $O_2$ |
| 1 | 20° C. | 7 | 0.15 | 1.6 ppm | 4 ppm | ≅1 ppb | ≅1 ppb |
| 2 | 20° C. | 7 | 0.15 | 1.8 ppm | 4 ppm | 50 ppb | ≅1 ppb |

Pb is the pressure expressed in bar absolute.
U (m/s) is the linear velocity of the gas through the reactor expressed in $m.s^{-1}$.

As may be observed in the preceding Table I, after the first purification cycle, the purified nitrogen comprises approximately 1 ppb of CO and $O_2$; these results are thus entirely satisfactory and demonstrate the efficiency of hopcalite in the purification of gaseous nitrogen from its $O_2$ and CO pollutants.

After the second purification cycle, it is observed that the efficiency of the adsorbent of hopcalite type is constant and maximum as regards the purification of the nitrogen from its oxygen impurity. In contrast, the result obtained for the CO is less satisfactory but nevertheless makes it possible to remove the majority of the CO contained in the nitrogen to a level of the order of a few tens of ppb.

In fact, the result obtained for the CO after Test 2 (50 ppb) is explained by poor regeneration of the adsorbent during the regeneration phase.

In order to confirm this hypothesis of poor regeneration of the adsorbent, a second series of tests was carried out, the regeneration protocol given in Example 2 being followed.

EXAMPLE 2

The adsorbent of hopcalite type employed in Example 1 was regenerated a further time by applying the following regeneration protocol:

stripping with hot gaseous nitrogen (for example at 250° C.) in order to reheat the adsorber;

reactive stripping using an $H_2/N_2$ (4%) mixture is carried out at a throughput of 0.5 $Sm^3/h$ and at a temperature of 250° C. for 2 h and then 300° C. for 4 h;

stripping under gaseous nitrogen is then carried out at a throughput of 0.5 $Sm^3/h$ and at a temperature of 300° C. for 16 h;

finally, the adsorbent is recooled using gaseous nitrogen (at ambient temperature) to ambient temperature; time necessary: 4 h 30.

The reactive stripping using the $H_2/N_2$ (2 to 5%) reducing mixture makes it possible to reactivate the hopcalite. However, this reactivation of the hopcalite also brings about the formation of water, which it is then necessary to remove by virtue of stripping using hot nitrogen (300° C.); this also makes it possible to discharge the residual hydrogen resulting from the reactivation mixture.

EXAMPLE 3

After regeneration (see Example 2), the adsorbent (hopcalite) is subjected to further purification tests; the results are recorded in Table II below.

The carbon monoxide and oxygen are thus clearly removed by adsorption.

EXAMPLE 4

This example is targeted at demonstrating the efficiency of the adsorbent of hoocalite type in the purification of a nitrogen flow from its $O_2$ impurity in comparison with an adsorbent of zeolite type used in conventional processes.

With this aim, the hopcalite is replaced by an adsorbent of zeolite type (100 g) and then the protocol described in Example 3 is applied (the operating conditions are thus identical).

The results are recorded in Table III below.

TABLE III

| TEST | TEMPER-ATURE | Pb | U (m/s) | AT THE INLET $O_2$ | AT THE OUTLET $O_2$ | DUR-ATION |
|---|---|---|---|---|---|---|
| 4 | 20° C. | 7 | 0.10 | 4.6 ppm | 1 ppm | 0.5 h |
| 5 | 20° C. | 7 | 0.10 | 4.6 ppm | 4.6 ppm | 33 h |

It is observed that, after 33 hours of purification, the nitrogen flow at the outlet still contains an amount of $O_2$ substantially equal to that contained in the nitrogen flow to be purified.

Thus, under the same pressure, throughput and temperature conditions, the zeolite does not make it possible to catch

TABLE II

| | | | | AT THE INLET | | AT THE OUTLET | | |
|---|---|---|---|---|---|---|---|---|
| TEST | TEMPERATURE | Pb | U (m/s) | CO | $O_2$ | CO | $O_2$ | DURATION |
| 3 | 20 C. | 7 | 0.10 | 1.7 ppm to 2.5 ppm | 4.6 ppm to 7.6 ppm | N.D. | N.D. | 210 h |

Test 3 was carried out while using approximately 90 g of hopcalite and while observing the operating conditions given in Table II.

The flow of chemically inert compound to be purified is nitrogen containing from 1.7 to 2.5 ppm of carbon monoxide (CO) and from 4.6 to 7.6 ppm of oxygen ($O_2$).

As may be observed on reading the results recorded in Table II, after 210 hours of purification, the nitrogen flow at the outlet contains amounts of $O_2$ and CO which are undetectable by conventional analysers having detection thresholds of the order of a ppb.

This Test 3 thus confirms, on the one hand, that hopcalite makes it possible very efficiently to trap the $O_2$ and CO impurities contained in a flow of an inert compound (in this instance nitrogen) to a level of less than or equal to a ppb and, on the other hand, that the result obtained during Test 2 (Example 1) for the CO (50 ppb) is due to a poor regeneration of the hopcalite.

The removal of CO and $O_2$ by adsorption and not by catalysis was confirmed using an infrared analyzer, such as that sold by the company Maihak under the name Unor 6N (detection threshold for $CO_2$: approximately 10 ppb).

The $CO_2$ content was analyzed throughout the duration of the tests. At no time did the analyzer detect an increase in the $CO_2$ content synonymous with oxidation of the CO and thus with an oxidative catalysis.

the oxygen contained in a gaseous flow of a chemically inert compound, such as nitrogen, whereas the hopcalite makes possible a purification to less than or equal to a ppb.

I claim:

1. Process for the purification of a chemically inert gas to be purified, containing at least one of $O_2$ and CO as impurities, from at least one of the impurities, which comprises:

a) passing the gas to be purified through an adsorbent comprising a mixed oxide of at least two transition metals, said gas having a temperature of between −40° C. and +50° C.;

b) recovering a gas which is substantially purified from at least one of the $O_2$ and CO impurities.

2. Process according to claim 1, wherein the temperature of the gas to be purified is ambient temperature.

3. Process according to claim 1, wherein the gas to be purified is essentially comprised of gaseous nitrogen.

4. Process according to claim 1, wherein the mixed oxide of at least two transition metals comprises a mixed oxide of copper and of manganese.

5. Process according to claim 4, wherein the mixed oxide of copper and manganese is hopcalite.

6. Process according to claim 4, wherein the mixed oxide of copper and manganese comprises from 40 to 70% by weight of a manganese oxide and from 25 to 50% by weight of a copper oxide.

7. Process according to claim 6, further comprising regenerating the adsorbent subsequent to adsorption of the impurity.

8. Process according to claim 7, wherein the adsorbent is divided into two distinct regions, one of these regions operating to adsorb the impurity, while the other region is regenerated.

9. Process according to claim 1, wherein the gas to be purified is at a pressure of 1 to 30 bar absolute.

10. Process according to claim 9, wherein the gas to be purified is at a pressure of 3 to 10 bar absolute.

* * * * *